(12) United States Patent
Melfi et al.

(10) Patent No.: US 10,974,341 B2
(45) Date of Patent: Apr. 13, 2021

(54) WELDING WAVEFORM FOR STAINLESS STEEL APPLICATIONS

(71) Applicant: LINCOLN GLOBAL, INC., Santa Fe Springs, CA (US)

(72) Inventors: Teresa Melfi, Kirtland, OH (US); Nathaniel McVicker, Lakewood, OH (US)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 663 days.

(21) Appl. No.: 15/629,195

(22) Filed: Jun. 21, 2017

(65) Prior Publication Data

US 2017/0368631 A1    Dec. 28, 2017

Related U.S. Application Data

(60) Provisional application No. 62/355,367, filed on Jun. 28, 2016.

(51) Int. Cl.
| | | |
|---|---|---|
| *B23K 9/18* | (2006.01) | |
| *B23K 9/23* | (2006.01) | |
| *B23K 9/09* | (2006.01) | |
| *B23K 9/095* | (2006.01) | |
| B23K 103/04 | (2006.01) | |

(52) U.S. Cl.
CPC ............... *B23K 9/18* (2013.01); *B23K 9/092* (2013.01); *B23K 9/095* (2013.01); *B23K 9/186* (2013.01); *B23K 9/23* (2013.01); *B23K 2103/05* (2018.08)

(58) Field of Classification Search
CPC .......... B23K 9/092; B23K 9/095; B23K 9/18; B23K 9/186; B23K 9/23; B23K 2103/05
See application file for complete search history.

(56) References Cited

U.S. PATENT DOCUMENTS

| | | | |
|---|---|---|---|
| 3,253,119 A * | 5/1966 | Manz | B23K 9/0673 219/130.4 |
| 3,670,135 A | 6/1972 | Zvanut | |
| 4,258,242 A * | 3/1981 | Fujimori | B23K 9/188 219/137 R |
| 5,022,936 A | 6/1991 | Tsujimura | |
| 6,042,782 A | 3/2000 | Murata | |
| 6,172,333 B1 | 1/2001 | Stava | |
| 6,204,477 B1 | 3/2001 | Lai | |
| 6,225,598 B1 | 5/2001 | Nihei et al. | |
| 6,376,802 B1 * | 4/2002 | Tong | B23K 9/08 219/130.21 |
| 6,384,376 B1 | 5/2002 | Plottier | |
| 7,173,214 B2 | 2/2007 | Nadzam | |
| 7,304,269 B2 | 12/2007 | Fulmer | |
| 7,842,903 B2 * | 11/2010 | Myers | B23K 9/1062 219/130.21 |
| 2001/0009252 A1 * | 7/2001 | Hiraoka | B23K 9/173 219/125.12 |
| 2002/0130117 A1 | 9/2002 | Briand | |
| 2006/0201915 A1 | 9/2006 | Obana | |
| 2007/0170164 A1 | 7/2007 | Nadzam | |

(Continued)

*Primary Examiner* — Erin E McGrath
(74) *Attorney, Agent, or Firm* — Brad C. Spencer (57) ABSTRACT

Specific AC welding waveforms are utilized to increase the toughness level of austenitic stainless steel above what is achieved using the same welding consumables using standard DC welding waveforms.

10 Claims, 10 Drawing Sheets

(56) References Cited

U.S. PATENT DOCUMENTS

| | | | |
|---|---|---|---|
| 2007/0246448 A1* | 10/2007 | Nishisaka | B23K 9/092 219/130.51 |
| 2007/0262065 A1* | 11/2007 | Peters | B23K 9/32 219/130.5 |
| 2008/0156781 A1* | 7/2008 | Artelsmair | B23K 9/091 219/130.5 |
| 2012/0097656 A1 | 4/2012 | Peters | |
| 2013/0264323 A1 | 10/2013 | Daniel | |

* cited by examiner

WELDING WAVEFORM FOR STAINLESS STEEL APPLICATIONS

PRIORITY CLAIM

The present application claims priority to U.S. Provisional Patent Application No. 62/355,367 filed on Jun. 28, 2016, the entire disclosure of which is fully incorporated herein by reference.

TECHNICAL FIELD

The invention described herein pertains generally to a method for welding stainless steel.

BACKGROUND OF THE INVENTION

The modern world is perhaps more indebted to steel development than any other technological advancement. This is evident from the fact that we dub whole epochs by their metallurgical capabilities; i.e. bronze age, iron age, etc. In the past century, steel research and production have created steels which are capably strong and tough at high, power generation-type temperatures while still being relatively lean (1.25 wt-% Cr, 0.5 wt-% Mo) and ferritic. Cold service, on the other hand, is the weak point of plain carbon and low alloy steels. A suitable low alloy steel capable of withstanding cryogenic temperatures with adequate crack resistance (toughness) has yet to be developed. Such an alloy may not even be possible, as the ferrite crystallographic phase undergoes a ductile-to-brittle transition at low temperature, dependent upon alloy system. Thus, stainless and nickel based steels having primarily austenite crystallographic phase are used for low temperature cryogenic applications. Oftentimes, welding and fabrication codes call for specialty austenitic stainless steel which ensure a low percentage of ferrite in the weld deposit by tightly controlling weld metal composition.

Currently, submerged arc welding is one of the most productive methods for arc welding stainless steels, but the toughness of nominally matching submerged arc weld metal is typically much lower than that of the base material, especially at these low temperatures. This requires component and vessel designers to make concessions in the design to accommodate these lower toughness welds. It also requires fabricators to purchase consumables to very strict chemical compositions, which is expensive. Further, fabricators must tightly control their welding procedures to obtain an adequate toughness level.

Ferrite number requirements for austenitic stainless filler metals as listed in ASME BPVC.VIII.1-2015 UHA-51 (a)(3)(-a)(-1) exist because the toughness of austenitic stainless steels at cryogenic temperatures is sensitive to ferrite content when using conventional welding processes. However, submerged arc welding of 316 L filler metals with the stainless steel waveforms of the present invention have proven that equivalent-to-superior toughness can be had when welding with conventional 316 L electrodes using a modified waveform compared to welding with a more expensive controlled ferrite number electrode, such as 316 LCF using conventional DC welding.

SUMMARY OF THE INVENTION

In accordance with exemplary embodiments of the present invention, a submerged arc welding system is described which includes: a welding power source which generates a welding output for performing a welding process on stainless steel, the welding output having at least one of a welding output current or welding output voltage in accordance with an AC welding waveform; a controller which controls the welding power source in accordance with the welding waveform to generate the welding output having a desired negative effect (see Eq. 1). In exemplary embodiments, the desired welding effect is less than 100. However, in other exemplary embodiments the negative effect can be a negative number, for example it can be in the range of −100 to 100. In further exemplary embodiments, the negative effect can be in the range of −100 to 0. Additionally, embodiments of the present invention can be used in high current welding operations, such as 1,000 amps, and in such embodiments the negative effect can be in the range of −700 to 100, and in further embodiments can be in the range of −700 to 0. In further exemplary embodiments, the negative effect is in the range of −80 to 80, and in other embodiments, the welding effect is in the range of −80 to 0. This range can provide appreciably improved mechanical properties when welding in a range of 300 to 400 amps in a SAW type welding application.

Further disclosed are exemplary methods of welding, for example with submerged arc welding systems, in which a higher ferrite number electrode, having a ferrite number of between 5 and 10 inclusive is used to weld stainless steel for cryogenic applications as if it were a lower controlled ferrite number electrode having a ferrite number of less than 5, comprising the steps of: providing a workpiece made of stainless steel, the workpiece to be welded for use in cryogenic applications; providing a welding power source which generates a welding output having at least one of a welding output current and a welding output voltage in accordance with a nonstandard AC welding waveform; providing a controller which controls the welding power source in accordance with the welding waveform to generate the welding output, wherein the welding output has a negative effect of less than 100; and performing a weld on the workpiece using said welding waveform, using a submerged arc flux and a 308 L or 316 L electrode having a ferrite number of 10 or less, said resultant weld having a toughness of greater than 40 foot-pounds at −320° F. (−195.6° C.).

BRIEF DESCRIPTION OF THE DRAWINGS

The invention may take physical form in certain parts and arrangements of parts, a preferred embodiment of which will be described in detail in the specification and illustrated in the accompanying drawing which form a part hereof, and wherein.

DETAILED DESCRIPTION OF THE INVENTION

Exemplary embodiments of systems and methods of the present invention will now be described. The examples and figures are illustrative only and not meant to limit the invention, which is measured by the scope and spirit of the claims. Specifically, while exemplary embodiments of the invention described herein are discussed within the context of submerged arc welding systems, those discussions are exemplary as embodiments of the present invention can be used with other known welding systems such as GMAW, GTAW etc., while not departing from the spirit and scope of the present invention. Specifically, the discussion of embodiments below using a submerged arc welding system are intended to be exemplary and not limiting, while the other systems which can employ embodiments of the present invention, whose operation and structure are well known, need not be described herein for efficiency.

As defined herein, "negative effect", shown in Equation 1, represents the aggregate negative bias of an individual waveform, taking into account the effect of current and voltage, their peak amplitudes, and time spent in the positive and negatively charged region.

$$\text{Negative Effect} = \left[0.7*\left(\frac{I_{p,p}*B - I_{p,n}*(100-B)}{100}\right)*(I_{p,p}+I_{p,n}) + 0.3*\left(\frac{V_{p,p}*B - V_{p,n}*(100-B)}{100}\right)*(V_{p,p}+V_{p,n})\right]*\left(\frac{1}{1000}\right) \quad \text{Eq. 1}$$

wherein:
B=percentage of time electrode is positively charged
$I_{p,p}$=peak current in electrode positive region
$I_{p,n}$=peak (absolute) current in electrode negative region
$V_{p,p}$=peak voltage in electrode positive region
$V_{p,n}$=peak (absolute) voltage in electrode negative region Stainless steels are engineering materials capable of meeting a broad range of design criteria. They exhibit excellent corrosion resistance, strength at elevated temperature, toughness at cryogenic temperature, and fabrication characteristics and they are selected for a broad range of consumer, commercial and industrial applications. In the fabrication of stainless steel products, components, or equipment, manufacturers employ welding as the principal joining method. Stainless steels are weldable materials, and a welded joint can provide optimum corrosion resistance, strength and fabrication economy.

By definition, stainless steels are iron-based alloys containing 10% or more chromium, which imparts the corrosion-resistant properties for which stainless steels are so highly regarded. The chromium content may be increased and other alloying elements added or adjusted to meet specific end-use or manufacturing requirements. During the welding of stainless steels, the temperatures of the base metal adjacent to the weld reach levels at which microstructural transformations occur. The degree to which these changes occur, and their effect on the finished weldment, in terms of resistance to corrosion and mechanical properties, depends upon alloy content, thickness, filler material, joint design, weld method and welder skill.

Figure 8:
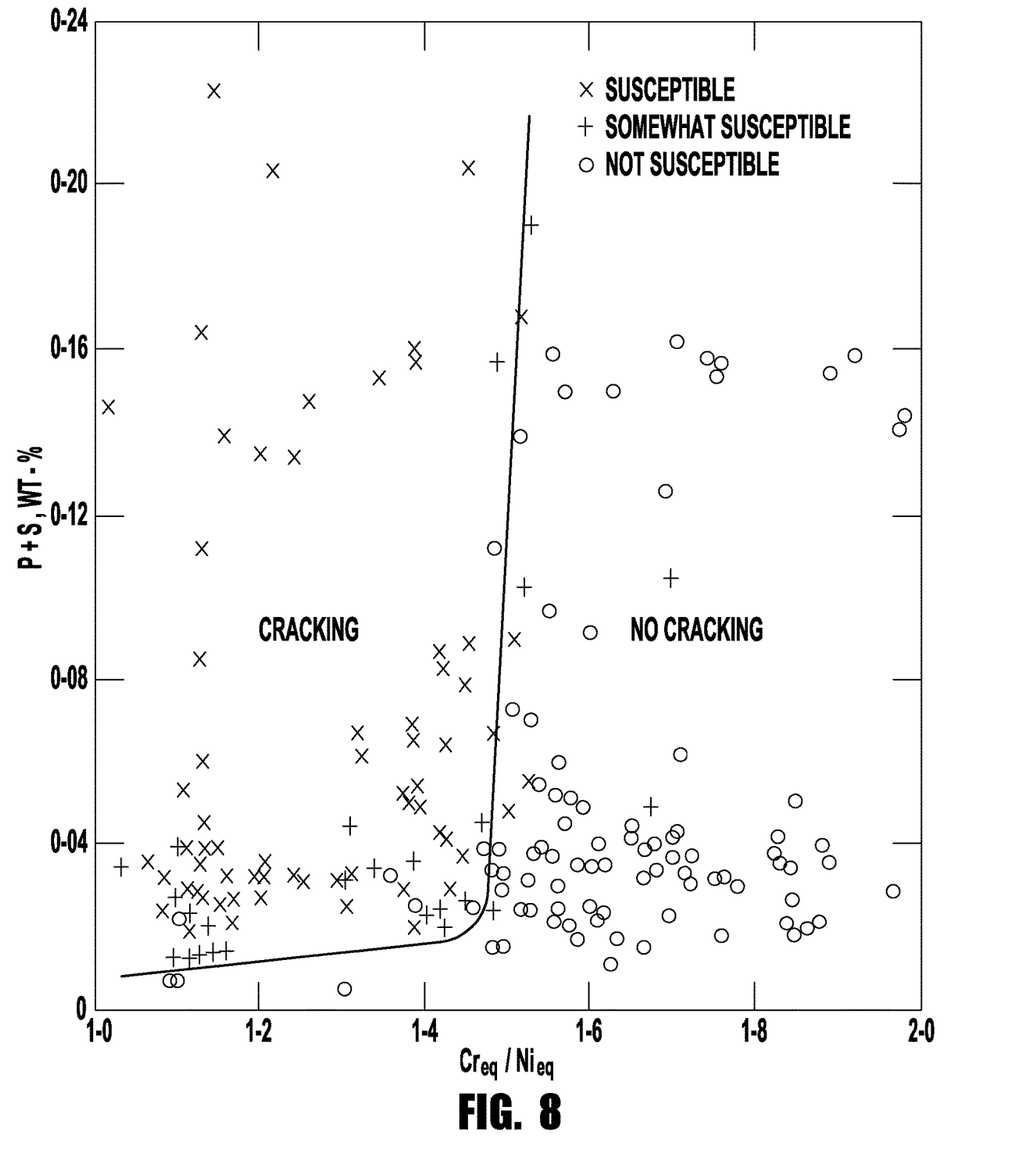
FIG. 8 is a diagrammatical representation of the Suutala Diagram.
Figure 9:
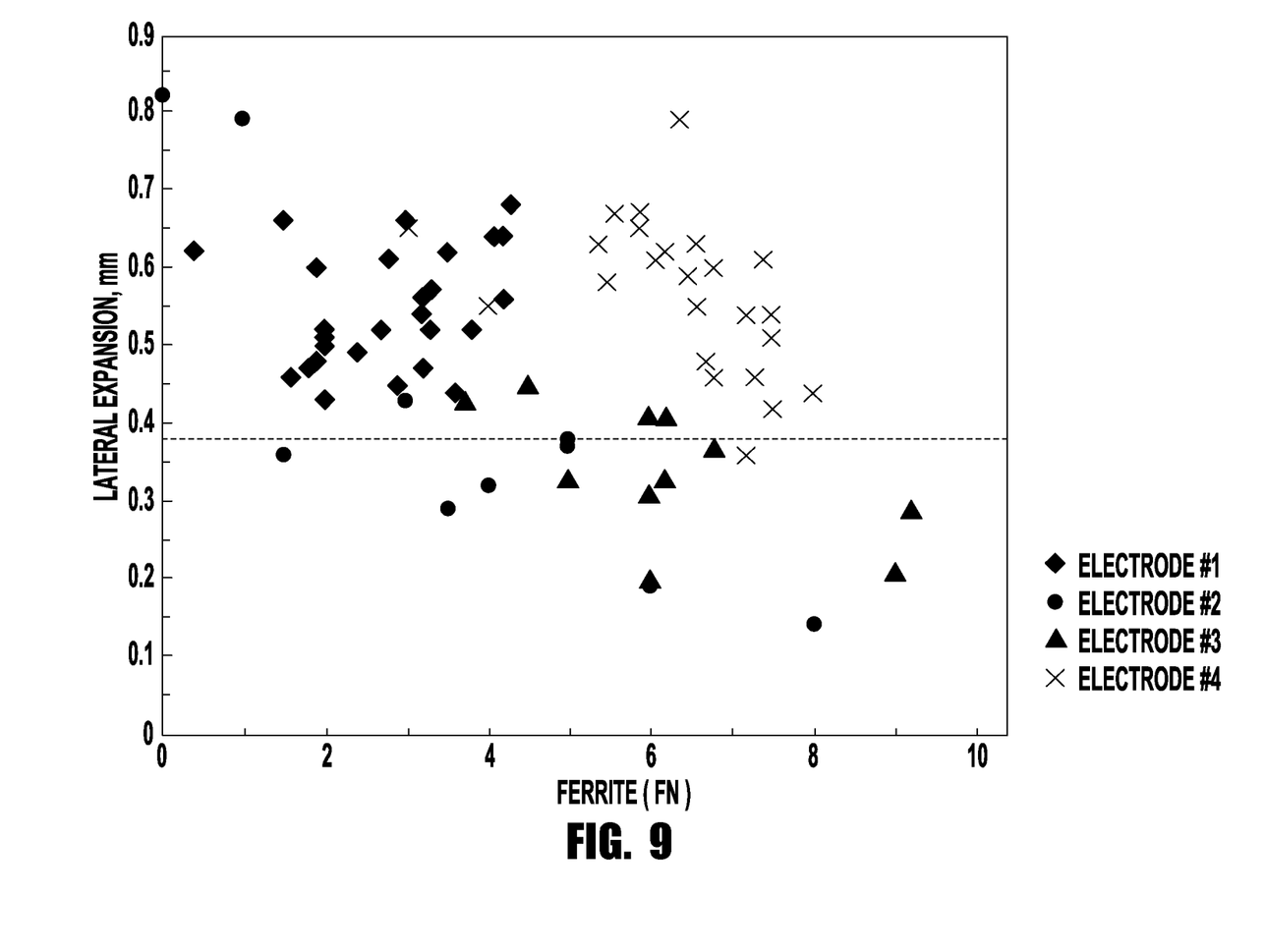
FIG. 9 is a diagrammatical representation of a plot of lateral expansion (mm) vs. Ferrite Number.

The microstructure of the weld metal strongly affects susceptibility to solidification cracking. Weld metal having a wholly austenitic microstructure is considerably more sensitive to conditions that promote solidification cracking than weld metal containing some delta or free ferrite in an austenitic matrix. Consequently, whenever possible a ferrite-containing austenitic weld structure is employed. The Schaeffler diagram is used to determine whether a specified weld metal composition will contain delta ferrite, and the approximate percentage. As to how much ferrite is needed in a weld deposit to prevent cracking, according to the Welding Research Counsel, both ASME and NRC have adopted a policy of 5 FN minimum for the welding consumables to be used in nuclear work, and 3 FN minimum in any multipass weld to prevent solidification cracking. As illustrated in FIG. 8, higher $Cr_{eq}/Ni_{eq}$ value is equivalent to higher FN number. Therefore, using a higher ferrite electrode with the invention moves away from the cracking threshold value of ~1.5 $Cr_{eq}/Ni_{eq}$ shown on the Suutala diagram.

This invention pertains to the welding of stainless steels for cryogenic applications using submerged arc welding ("SAW"), as well as other types of welding methodologies. That is, embodiments of the present invention employ methods where the heat required to fuse the metal is generated by an electric current passing between the welding wire (solid metal or cored) and the workpiece. As is generally known, in submerged arc welding the tip of the welding wire, the arc and the workpiece weld area are covered by a layer of granulated mineral flux. There is no visible arc and no sparks or spatter. The welding flux is fed continuously through a hopper tube and continuously distributes itself over the seam a short distance ahead of the welding zone, some of which melts to form a slag covering. The flux shields the welding zone from contact with the atmosphere. A small amount of the flux fuses. This fused portion serves several functions. It completely blankets the top surface of the weld, preventing atmospheric gases from contaminating the metal and pulls impurities out of the molten steel by combining with them and floating to the surface. Molten flux interactions with the weld pool can also be the vehicle for adding certain alloying elements to the weld.

Figure 1:
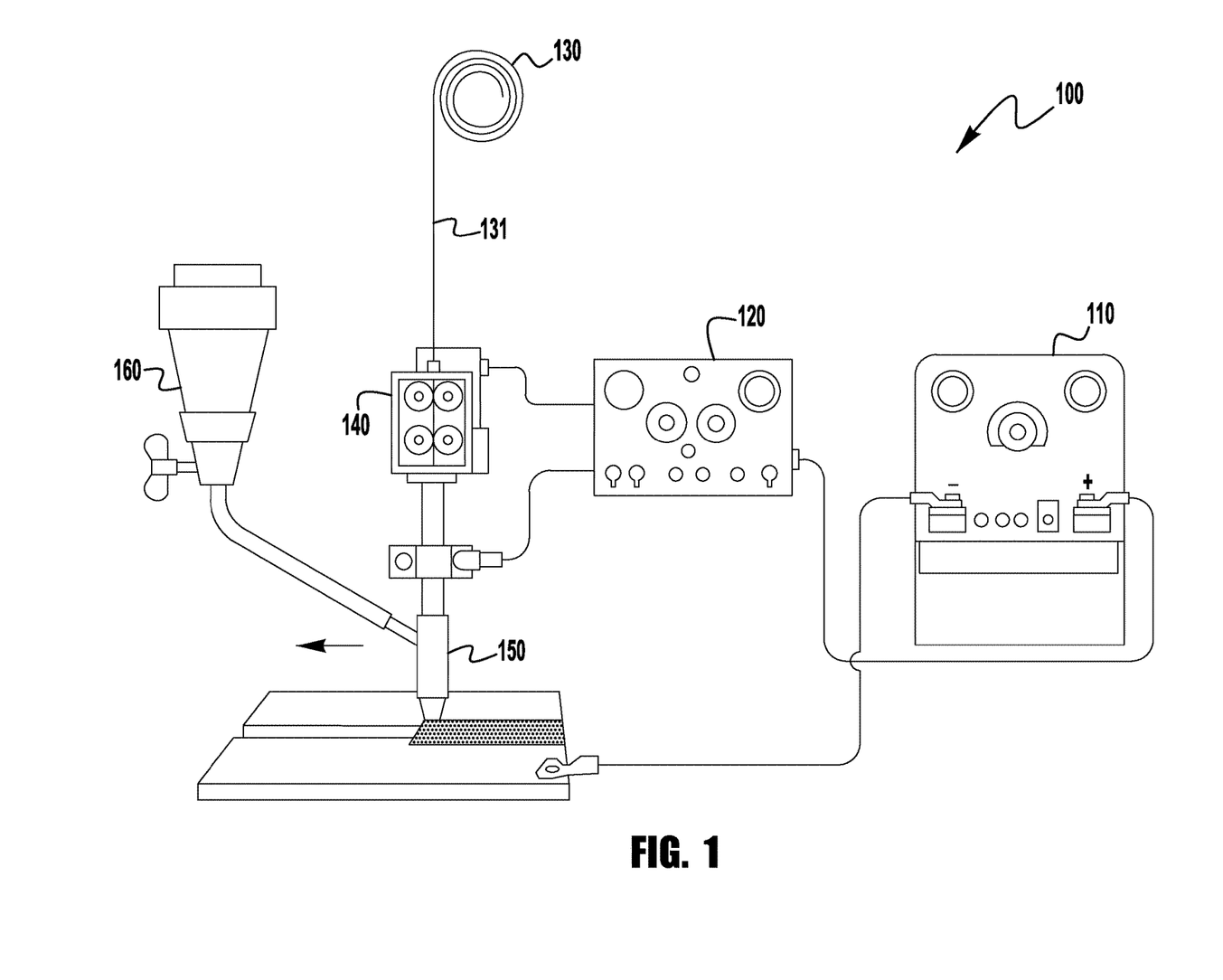
FIG. 1 is a diagrammatical representation of an exemplary submerged arc welding system.

FIG. 1 depicts an exemplary submerged arc welding system 100. Because the structure, construction and operation of submerged arc welding systems are well known they will not be discussed in detail herein. Similar, because other systems such as GMAW, GTAW, etc. are well known they will also not be discussed in detail herein. As shown in FIG. 1, the system 100 includes a power source 110 which can be any known type of power source that can be used for submerged arc welding, or other welding processes. The power source 110 can use power converter components such as rectifiers, boost, buck-boost or buck circuits, PWMs, inverters, etc. to convert an input power, such as from a utility grid to an output welding waveform having a current and a voltage for welding. This generated welding signal is output to a welding operation via a welding cable, welding torch, etc. The construction, design and operation of such welding power supplies is well known and need not be described in detail herein. The power source can have an internal, or be coupled to, a control system 120 which controls and/or regulates the operation of the power source 110. For clarity the control system 120 is shown as a separate component in FIG. 1, however, as known the control system 120 can be internal to the power source 110. The operation and construction of the control system 120 is well known, and can include a CPU, controller etc. which controls the power source 110 to provide the appropriate or desired welding output. That is, the control system 120 can be coupled to power output components such as a PWM or inverter which shapes and outputs the welding signal in accordance with a desired waveform. Control systems such as the type described herein are well known and their use and operation need not be described in detail herein. The control system 120 is also coupled to a wire feeder 140 (having a known construction) which feeds a consumable/wire 131 from a source 130. The wire 131 is provided to a welding torch 150 of known construction, which imparts the welding current/signal to the wire 131 for the welding operation. In a submerged arc welding operation a welding flux is provided via a flux hopper system 160. The system 100 shown in FIG. 1 is intended to be an exemplary representation of a welding system of the present invention and, of course, those of ordinary skill in the art would understand that other welding systems and system configurations can be used with exemplary embodiments of the present invention. For example, a flux recovery system can be employed, the system can be a GTAW or GMAW type system, as well as others. Additionally, the control and operation of exemplary welding systems described herein is known and within the skill in the art. For example, it is known that control systems receive and utilize feedback from the welding operation, as well as user input information, and use this information to control the welding output of the power source to provide the desired waveform. Because of this, the construction and operation of the control system 120 need not be described in detail herein. For example, it is known that the control system 120 can have a user interface (for the input of weld parameters), a controller, CPU, memory, etc. These components are used to control the output of the welding waveform as desired and to achieve the desired negative effect as described more fully herein.

Again, while embodiments of the present invention can be used with different types of welding operations, the following examples will be discussed with reference to submerged arc welding. One difference between submerged arc welding and other processes used to weld stainless steel is one of degree. Submerged arc welding can use much higher heat input than other processes and has slower solidification and cooling characteristics. In submerged arc welding, the welding heads (e.g., torch 150 in FIG. 1) are used to perform the triple function of progressively depositing metal along the welding groove, feeding the wire into the weld zone and transmitting the welding current to the welding wire. The flux is supplied from a hopper either mounted directly on the head or connected to the head by tubing. The bare wire or cored electrode is fed into the welding head in straight lengths or from a coil or rod mounted on a rod reel, or from a pay-off pack.

The composition ranges for austenitic stainless steel as a whole and three of the most popular austenitic stainless steel alloys, 308 L, 309 L and 316 L are illustrated in Table I.

TABLE I

| | Composition wt % | | | | | | | |
|---|---|---|---|---|---|---|---|---|
| | Fe | Cr | Ni | Mn | Si | C | Mo | N |
| Austenitic Stainless | Bal. | 16.0-25.0 | 6.0-20.0 | 0-3.0 | 0.5-3.0 | 0.02-0.08 | 0-3.0 | 0-0.15 |
| 308L | Bal. | 18.0-21.0 | 9.0-11.0 | 0.5-2.5 | 1.0 | 0.04 | 0.75 | |
| 309L | Bal. | 22.0-25.0 | 12.0-14.0 | 0.5-2.5 | 1.0 | 0.04 | 0.75 | |
| 316L | Bal. | 17.0-20.0 | 11.0-14.0 | 0.5-2.5 | 1.0 | 0.04 | 2.0-3.0 | |

With rising demand for liquefied natural gas ("LNG"), the construction of LNG facilities is on the increase worldwide. Various materials are selected to withstand the onerous service conditions, including austenitic stainless steels. The construction and fabrication of LNG facilities will inevitably involve welding pipework which usually includes 304 L or 316 L austenitic stainless steel that will be subject to service below −160° C. or design temperatures down to −196° C. 304 L and 316 L are among the most widely used corrosion resistant alloys and have the benefit of being naturally tough and resistant to catastrophic brittle failure at the lowest temperatures, unlike lower alloy ferritic steels which display a sharp and temperature-dependent ductile-to-brittle transition. 304 L is typically welded using 308 L filler metal and 316 L is typically welded with 316 L filler metal.

Figure 2:
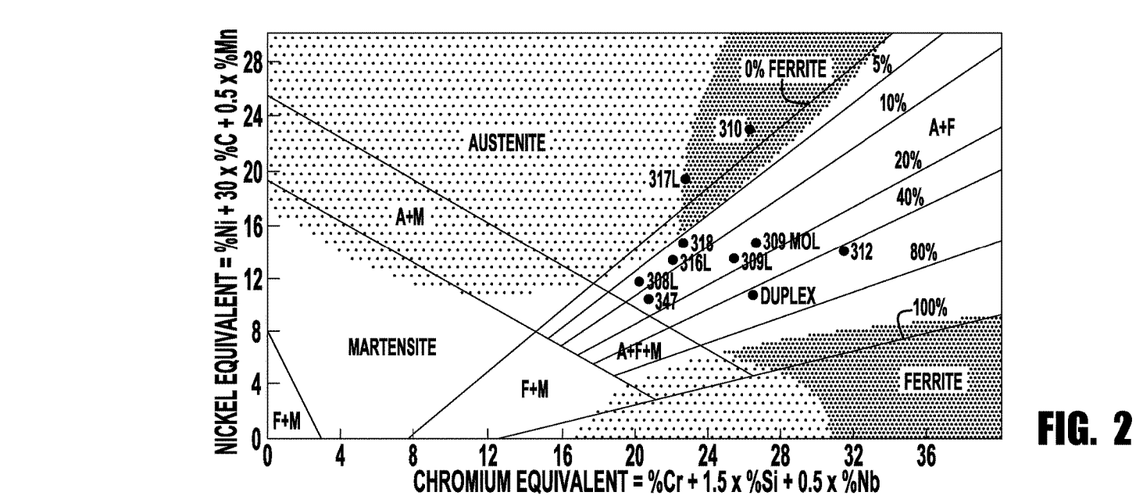
FIG. 2 is a diagrammatical representation of the Schaeffler diagram.

Ferrite number and content has heretofore been known to play a role on the toughness of 308 L and 316 L weld metals, with the general trend showing that, up to a certain point, as ferrite increases, the toughness is reduced. FIG. 2 illustrates a fundamental Schaeffler diagram in which the austenite morphological phase stabilizers are illustrated by the equivalent Nickel formula depicted as the ordinate of the graph while the ferrite stabilizers are illustrated by the equivalent Chromium formula depicted as the abscissa of the graph. Ferrite is important in avoiding solidification cracking during cooling of the welding of austenitic stainless steels. "Constitution diagrams" are used to predict ferrite levels from the composition by comparing the effects of austenite and ferrite stabilizing elements. The Schaeffler and also Delong diagrams are the original methods of predicting the phase balances in austenitic stainless steel welds.

A "nickel equivalent" is calculated for the austenite stabilizing elements and a "chromium equivalent" for ferrite stabilizing elements. These are used as the axes for the diagrams, which show the compositional equivalent areas where the phases austenite, ferrite, martensite (and mixtures of these) should be present. The nickel and chromium equivalents use the formulae:

$$Ni_{(eq)} = \% \ Ni + (30 \times \% \ C) + (0.5 \times \% \ Mn)$$

$$Cr_{(eq)} = \% \ Cr + \% \ Mo + (1.5 \times \% \ Si) + (0.5 \times \% \ Nb)$$

"Controlled Ferrite" grade electrodes are classified as 308 L and 316 L grades. However, their compositions are more stringently controlled to ensure a low ferrite weld deposit. The FIG. 2 Schaeffler diagram is used to estimate the resultant phase distribution of various alloys and welds. ASME Boiler and Pressure Vessel Code, Section VII, UHA-51(a)(3)(-a)(-1) specifies that 316 L welding filler metal must have a Ferrite Number which is less than or equal to 5, and 308 L welding filler metal must have a Ferrite Number ranging from 4 to 14, as determined by the WRC-1992 constitution diagram. In order to achieve less than 5 FN, the 316 L electrode composition must be controlled such that it does not go below the "5F" line in FIG. 2. Likewise, for 308 L filler metals, the compositions must be tightly controlled to produce the correct ferrite number. Hence, "controlled ferrite" electrodes are manufactured and sold to adhere to more strict FN requirements. However, these electrodes are more costly to produce and employ by the end-user, and they result in a weld metal that is at greater risk of solidification cracking due to the small amount of ferrite in the microstructure and illustrated by the Suutala Diagram, see FIG. 8.

TABLE I

Electrode Composition

| Element | Electrode Composition 316L ("controlled ferrite") | 316L |
|---|---|---|
| C | 0.02% | 0.01% |
| Cr | 18.4% | 19.0% |
| Ni | 12.7% | 12.3% |
| Mo | 2.7% | 2.2% |
| Mn | 1.8% | 1.7% |
| Si | 0.38% | 0.32% |
| P | 0.02% | 0.02% |
| S | 0.01% | — |
| N | 0.05% | 0.03% |
| Cu | 0.18% | 0.05% |
| Nb | 0.01% | — |
| Ferrite No. | 4.2-5.1 | 6-9 |

Design temperatures encountered for austenitic stainless steels used in LNG facilities may vary, but for simplicity and ease of testing, Charpy impact tests are normally carried out at −196° C. because this test temperature is conveniently obtained by cooling in liquid nitrogen. Toughness is proportional to the impact energy absorbed by fracture and lateral expansion is a measure of the Charpy test specimen deformation or fracture ductility. The most commonly specified toughness requirement is based on Charpy lateral expansion. This requirement for 0.38 mm lateral expansion at −196° C., which can be found in the ASME Code (e.g., ASME B31.3 for process piping), is frequently quoted.

In general, as ferrite percentage increases, the toughness of the weld is reduced. In general, when lateral expansion is plotted against ferrite content, it is noted that 0.38 mm lateral expansion cannot be guaranteed with a ferrite content above about ~4.5 FN.

The term "polarity" is used to describe the electrical connection of the electrode in relation to the terminal of a power source. With direct current (DC), when the electrode is connected to the positive terminal, the polarity is designated as direct current electrode positive (DCEP or DC+). When the electrode is connected to the negative terminal, the polarity is designated as direct current electrode negative (DCEN or DC−). When alternating current (AC) is used, the polarity changes from positive to negative and vice versa. A traditional AC output changes polarity every half cycle and is symmetric both in the time it spends in the positive and negative polarity zones and the magnitude of the peak in each zone, often in the shape of a sine wave. With AC output, the welding current alternates from positive flow to negative flow and back again.

Embodiments of the present invention describe waveforms to be alternating current (AC) to indicate that the current and/or voltage crosses between positive and negative polarities. It is not intended that these waveforms be symmetric in time or amplitude about the zero point, or even symmetric in any sense. Rather, the waveforms can spend more time or magnitude on each side of zero. It can be appreciated that the use of the term AC does not limit a welding waveform to one that resembles a conventional symmetric AC waveform, rather it can be a very complex waveform that at intervals crosses the zero point.

The waveforms may be shaped in such a way to provide a smooth transition across the zero point, and there may be different shapes to the current and the voltage waveforms to provide a smooth welding arc and minimize welding defects such as lack of fusion or slag inclusions.

Time in the negative region is accompanied by a change in the electron flow in the welding arc and is accompanied by an increased meltoff of filler metal into the weld pool, increasing the speed at which a weld can be produced. Time in the positive region is accompanied by an increase in penetration into the metal being joined. The shape of the waveform in each region can be manipulated to provide these benefits. The waveforms used in the invention provide higher deposition rates and productivity for the same welding current using conventional DC+ or conventional AC welding.

Figure 3:
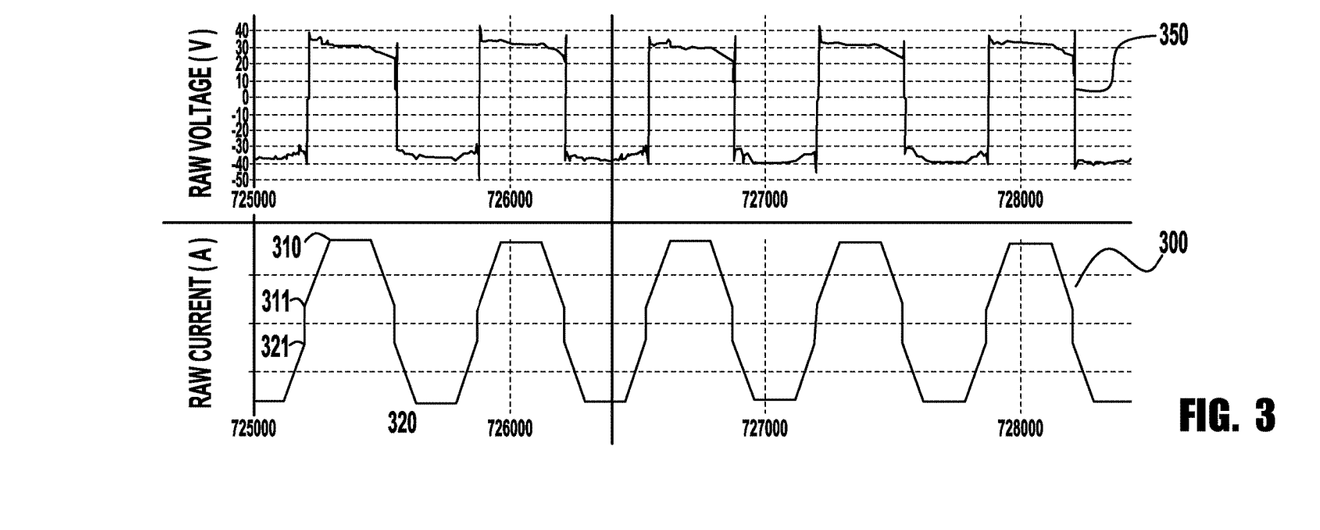
FIG. 3 is a diagrammatical representation of one exemplary embodiment of a welding waveform of the present welding system.

FIG. 3 illustrates an exemplary embodiment of a waveform outputted by the welding power source as part of this invention. The waveform is a form of alternating current waveform where the welding wire switches between cathode and anode. Welding waveforms can be controlled in part by the operator of the welding process, such as to control what percentage of time is spent by the welding wire in the positive current polarity. For example, FIG. 3 displays a waveform with 50% balance. 50% balance means that the wire is positively charged 50% percent of the time. A 100% balance is equivalent to a DC+ signal and a 0% balance is equivalent to a DC-signal. As shown in FIG. 3, an exemplary welding current 300 and corresponding voltage 350 is shown. The current waveform has a plurality of positive 310 and negative 320 pulses. Where each of the pulses have respective peaks current levels. In some embodiments the peak current levels can have the same amperage (albeit at different polarities) while in other embodiments the peak levels can be different. Also, as shown in the exemplary embodiment each of the pulses have at least two different current ramp rates. For example, as shown, each of the positive and negative pulses have a first current ramp rate (slope) after the current passes the 0 threshold, and then each of the pulses have a transition point (311/321 respectively) where the current transitions to a slower ramp rate (slope) until the current reaches the respective peaks. As shown, in some exemplary embodiments, the pulses have current slope transition points both as the current is increasing towards the peak levels and coming from their respective peak levels to the 0 threshold as shown. In some exemplary embodiments, the transition levels are at the same current level as the current is both increasing and decreasing, while in other embodiments they are at different current levels. In further exemplary embodiments, the transition levels for each of the positive and negative pulses are at the same relative transition current levels (albeit at different polarities) whereas in other embodiments the transition levels can be different between the positive and negative pulses. Further, in additional exemplary embodiments, the respective pulses can have an additional transition level where the current ramp rate changes to a third ramp rate. Further, in exemplary embodiments the respective first and second ramp rates in each of the positive pulses can be of the same magnitude. However, in other embodiments they can be different. For example, in some embodiments the first ramp rates in each of the positive and negative pulses can be the same (e.g., from 0 amps to the transition level), but in the positive pulses the second ramp rate (from transition to peak) has a first magnitude, and the second ramp rate in the negative pulses can either have a larger or smaller ramp rate (in magnitude) from the transition to the negative peak, depending on the desired waveform performance and negative effect as described herein.

In exemplary embodiments of the present invention, the transition level can be in the range of 100 to 350 amps, whereas in other exemplary embodiments the level(s) can be in the range of 150 to 300 amps. Further, in exemplary embodiments, the transition level can be in the range of 10 to 35% of the peak current level of the respective pulses. For example, if the positive peak current is 900 amps, the transition point 311 can be in the range of 10 to 35% of that peak current, whereas if the negative peak current is 800 amps, the transition point 321 can be in the range of 10 to 35% of that peak current. In other embodiments, the transition point can be in the range of 15 to 30% of the respective peak current.

Further, in the embodiment shown in FIG. 3, the durations of each of the respective positive and negative pulses are the same, however in other embodiments this may not be the case. For example, in some embodiments the duration of the positive pulses is longer than that of the negative pulses, or vive-versa. Similarly, in some exemplary embodiments the durations of the peak levels in the respective pulses are the same (regardless of the relative durations of the pulses), or they can be different. For example, in some embodiments, the negative peak duration can be longer than the positive peak duration, or vice versa.

In exemplary embodiments, the negative effect for a welding waveform can be defined by an ideal complete cycle of the waveform, that is one ideal cycle. However, in other embodiments the negative effect can be determined over a plurality of n cycles. In exemplary embodiments of the present invention, the desired negative effect is achieved/obtained for the entirety of the welding operation, that is the average negative effect for the welding operation is at the desired negative effect. That is, for the entirety of the utilized welding waveform over a given welding operation the desired negative effect (e.g., −100) is achieved. However, in other welding operations the desired negative effect is only achieved for a portion of the welding operation. For example, in some exemplary embodiments the welding waveform for a welding operation has at least a first portion and a second portion, where the first portion has the desired negative effect and the second portion does not. In some exemplary embodiments, the first portion can be in the range of 35 to 95% of the total duration of the welding operation. In other exemplary embodiments, the first portion can be in the range of 45 to 85% of the total duration. In those welding operations where the weld puddle is relative small, the overall duration of the desired negative effect portion of the waveform can be less than in those welding operations where the puddle is larger.

Figure 4:
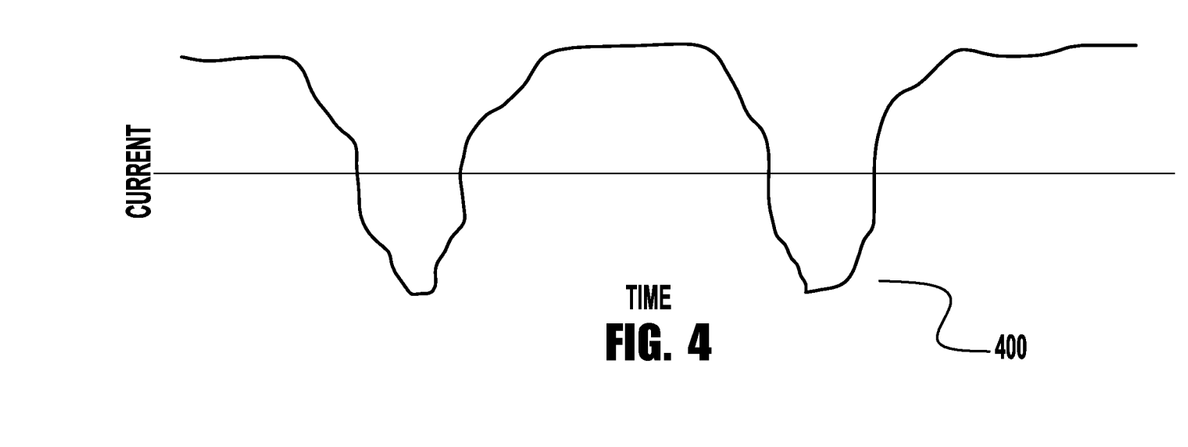
FIG. 4 is a diagrammatical representation of another exemplary embodiment of a welding waveform of the present welding system.
Figure 5:
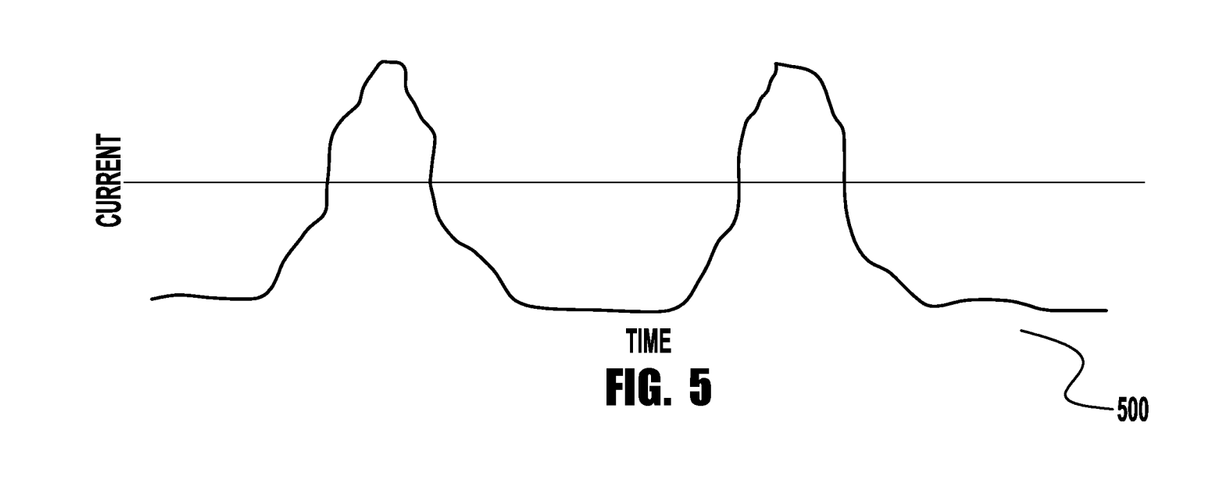
FIG. 5 is a diagrammatical representation of a graph of another exemplary embodiment of a welding waveform of the present welding system.

FIG. 4 Illustrates a current waveform 400 with 75% balance. This means that the wire is positively charged 75% of the time while FIG. 5 Illustrates a current waveform 500 with 25% balance. This means that the wire is positively charged 25% of the time.

Other waveform variables that can be directly changed by a welding operator may include Offset and Frequency. Offset allows the waveform to shift in the positive or negative current direction. For example, a positive offset would cause the peak positive current to increase and the peak negative current to decrease while maintaining RMS current. Frequency controls the cycle time of the waveform. It is noted that while specific waveform structures are shown in the examples herein, embodiments of the present invention are not limited to these waveforms. Other welding waveform shapes and structures can be used with embodiments of the present invention without departing from the spirit or scope of the present invention. However, in exemplary embodiments, to achieve the negative effect desired the waveform is to have a negative power bias.

In exemplary embodiments of the present invention, the desired negative effect can be input by a user into the power supply (see FIG. 1, e.g.) as a set point or control point for the welding operation. In such embodiments the power supply will control the welding waveform (consistent with known methods and processes) to ensure the desired negative effect is achieved. This can be done, for example, by adjusting the duration and/or magnitude of the negative and/or positive peaks of the pulses. In other exemplary embodiments the power supply can utilize a controller/processor to determine the negative effect of a welding waveform and display the determined negative effect to a user on a display of the power supply. As such displays and processors/computers are known, and can be implemented on the exemplary power supply discussed in FIG. 1, the details of this need not be described in detail herein. The user can thus user the input systems and/or user display on the power supply to adjust aspects of the waveform until a desired negative effect is calculated/determined for a given waveform. Once the desired negative effect is achieved with a given waveform, the welding process can be commenced. Of course, while in some embodiments the power supply is capable of performing these calculations and displaying the results, in other embodiments a separate/stand-alone computer etc. can be used to analyze the negative effect of a given waveform until a desired effect is achieved, and then a user can input that waveform into the power supply such that the desired welding waveform is achieved.

Figure 6:
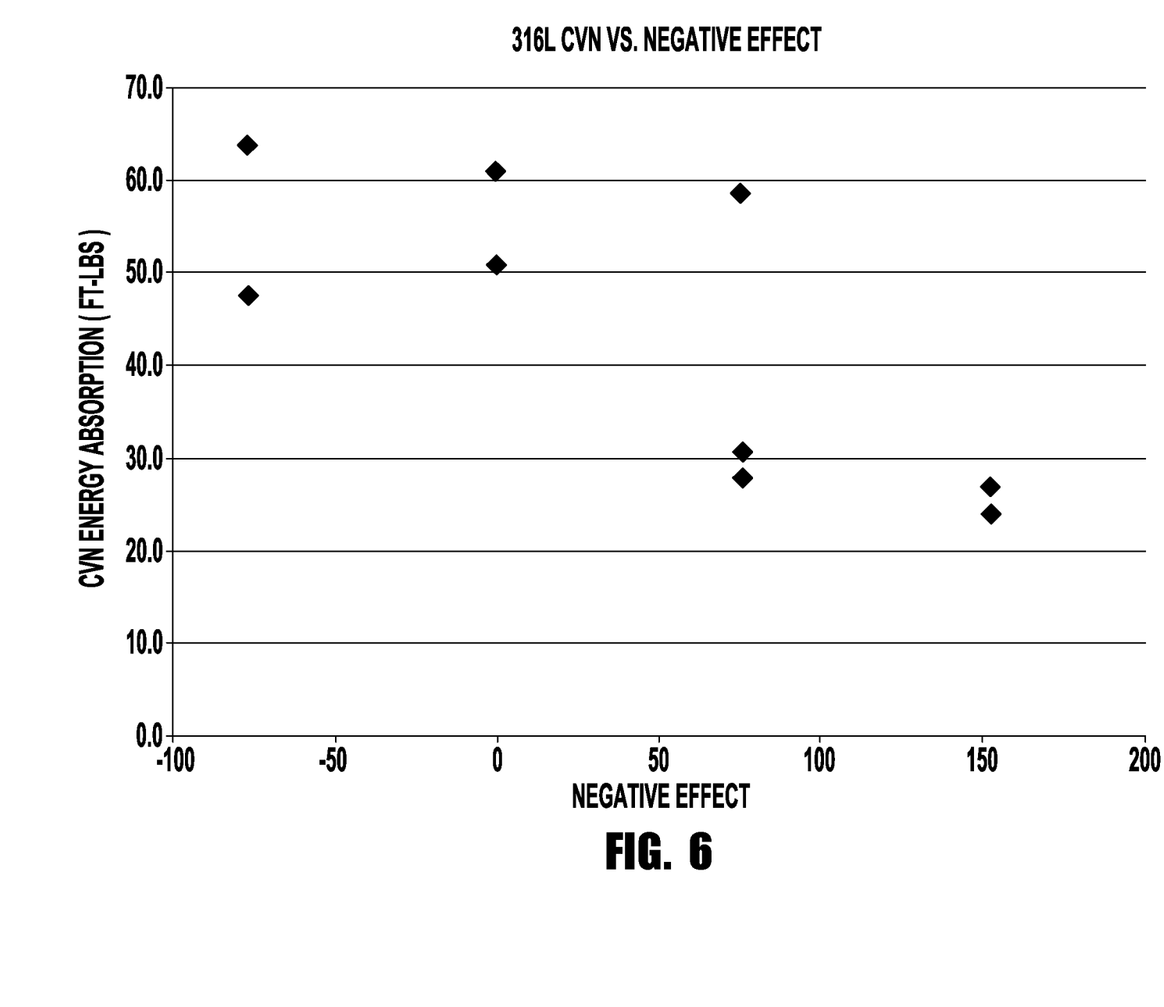
FIG. 6 is a diagrammatical representation of a chart displaying the relationship of negative effect on weld energy absorption when using a 316 L electrode.
Figure 7:
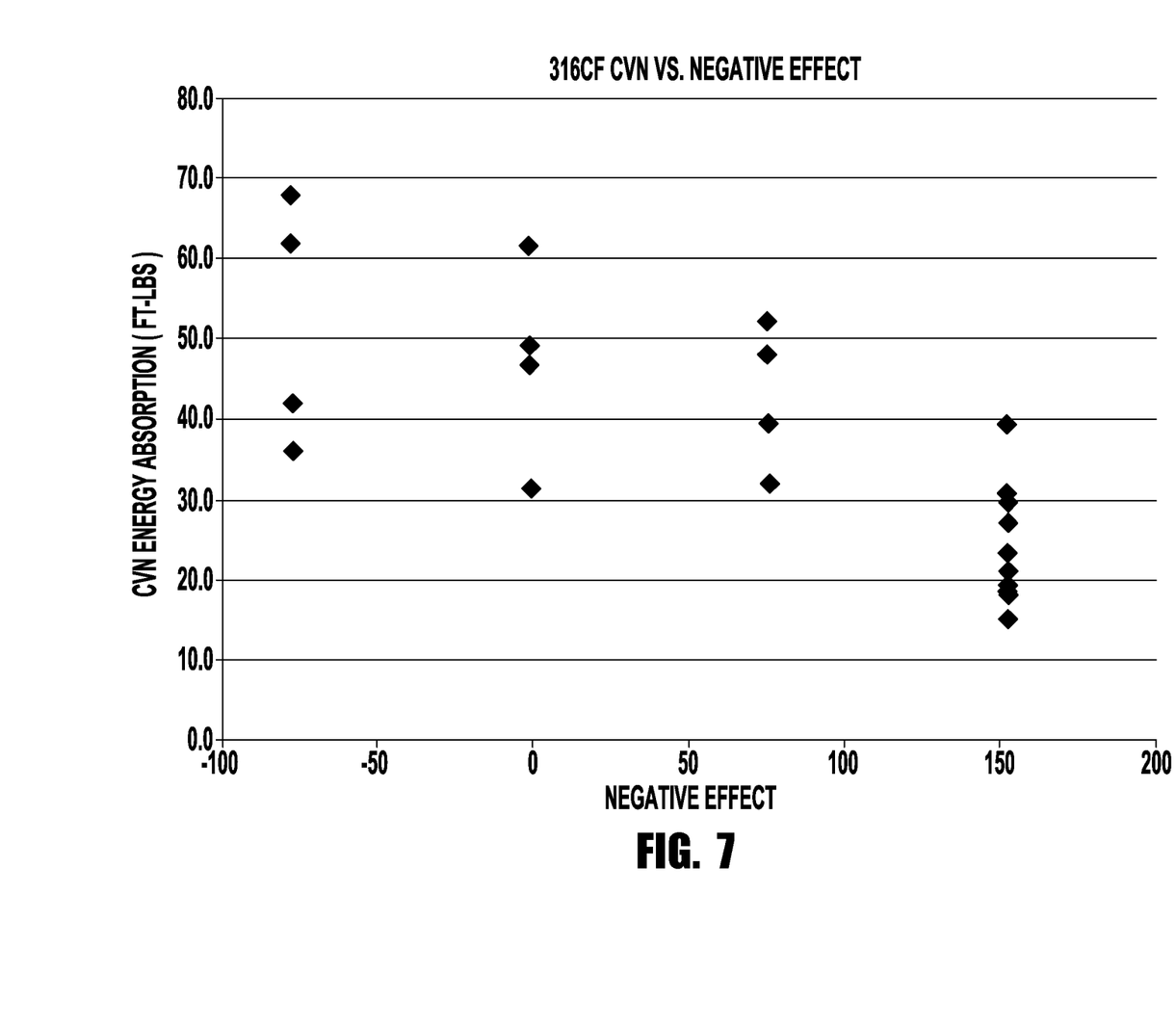
FIG. 7 is diagrammatical representation of a chart displaying the relationship of negative effect on weld energy absorption when using a 316 LCF electrode.

FIG. 6 & 7 display the effects of varying the waveform's negative effect on the energy absorption of the weld (measured in ft-lbs). As negative effect decreases, the toughness of the weld is increased. In a some exemplary embodiments, the polarity balance of the welding waveform is biased towards DC negative, e.g. the negative effect is less than 100. An example of such a waveform is displayed in FIG. 5.

Employing a waveform which changes polarity lowers the oxygen level of the weld metal, and decreasing the negative effect of a waveform increases the cooling rate of the weld metal. The combination of these, along with other variables, is postulated to be responsible for a resultant weld metal microstructure that provides high notch toughness at low temperatures. The value to the end-user is obvious. The 316 L electrode is significantly less expensive than a 316 LCF electrode, and yet comparable to superior weld metal physical properties are achievable. The invention also benefits from higher wire feed speed making a weld faster with the same energy input, thus saving labor and electricity. For example, some exemplary embodiments of the present invention can achieve wire feed speed rates which are up to 30% faster than prior welding processes having the same energy input.

Figure 12:
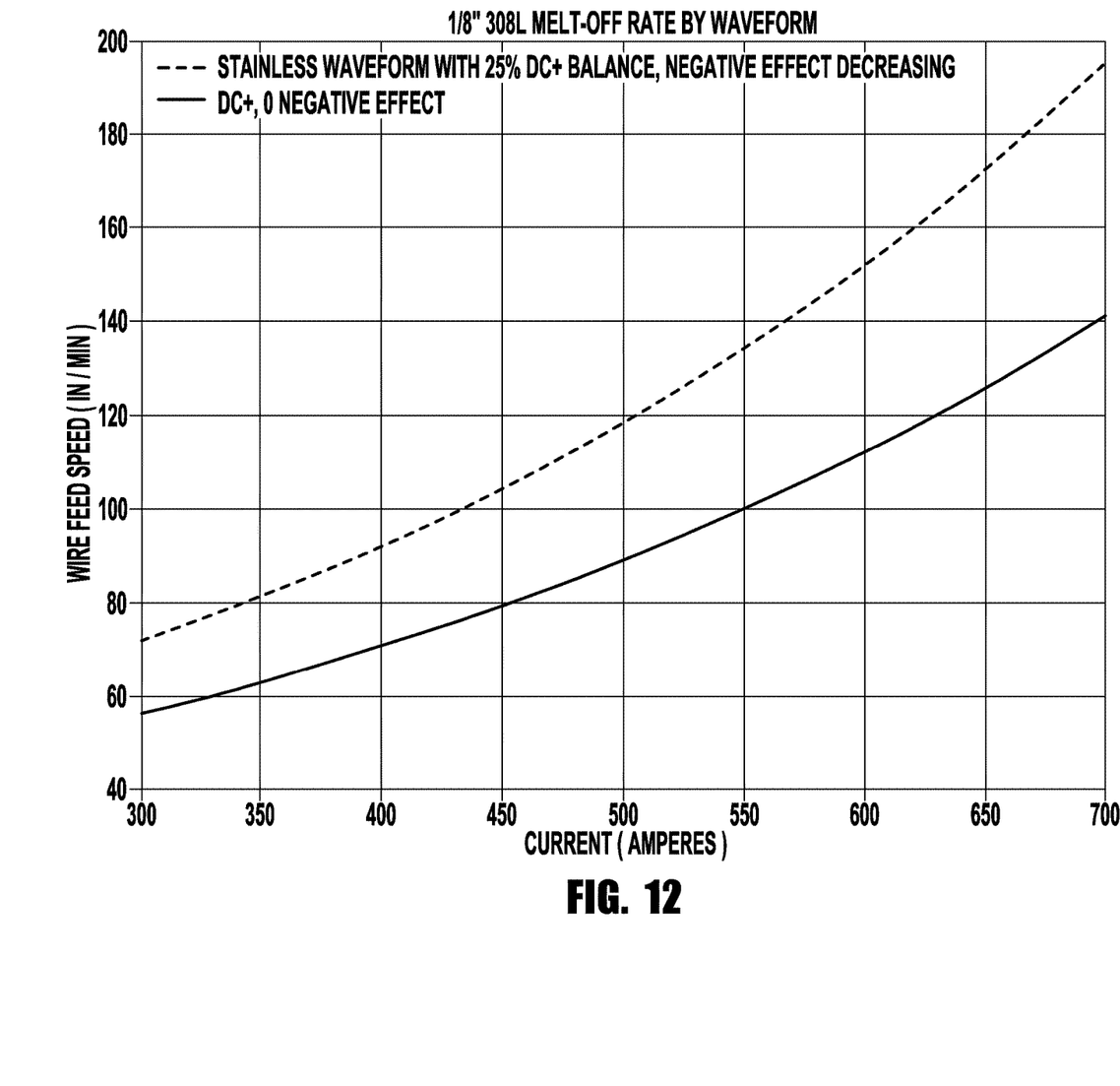
FIG. 12 is a diagrammatical representation of a depositions rates of a conventional process as compared to an exemplary process described herein.

For example, as shown in FIG. 12, when using a conventional DC+ waveform with a current 550 amps a wire feed speed of 100 inches/minute, or a deposition rate of 21.31 b/hr. However, when using an exemplary waveform of the present invention, having a 25% duration in the electrode positive polarity, with a negative effect as described herein, a wire feed speed of 135 in/min can be achieved. This is a significant improvement over known methods.

Figure 10:
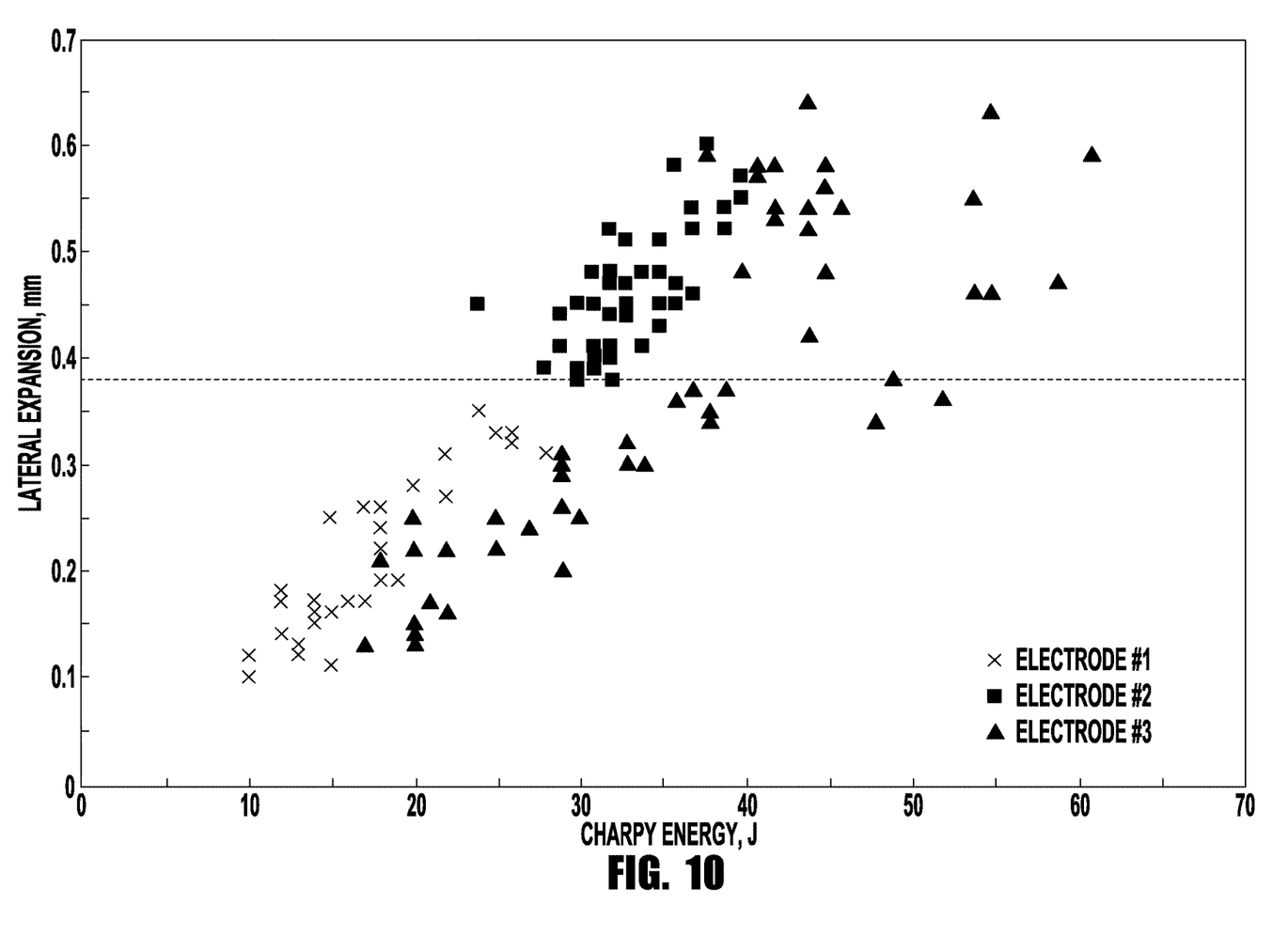
FIG. 10 is a diagrammatical representation of a plot of lateral expansion (mm) vs. Charpy Energy (J)

Data for standard stainless steel consumables are plotted in FIG. 10 using prior art waveforms which did not have a negative effect of less than 100. It can be seen that there is a relationship between Charpy toughness and lateral expansion in austenitic stainless weld metal.

Figure 11:
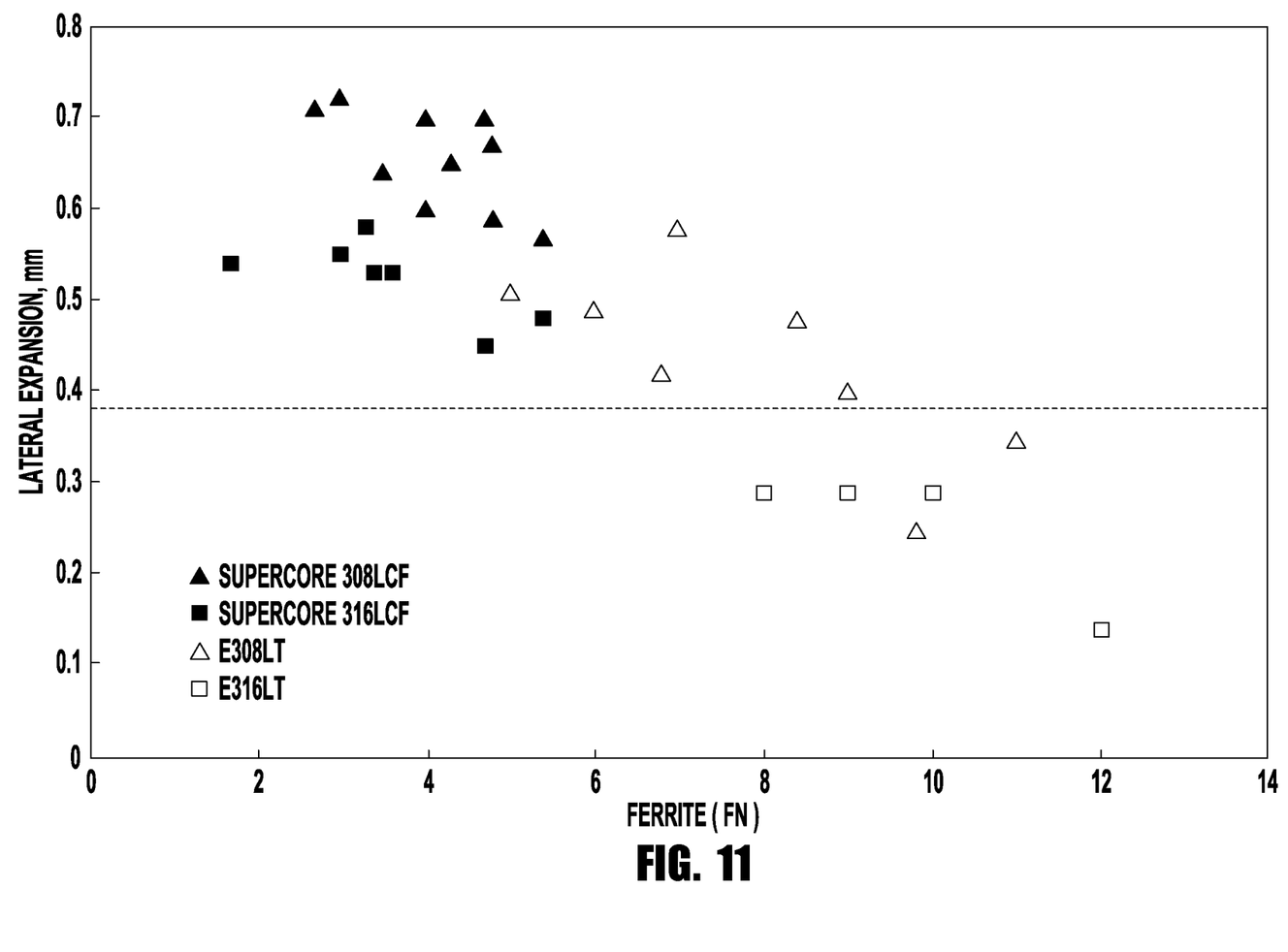
FIG. 11 is a diagrammatical representation of a plot of lateral expansion (mm) vs. Ferrite number.

As illustrated in FIG. 11, ferrite number also has an effect on the toughness of flux cored wire weld deposits at −196° C. (−320° F.) using prior art waveforms which did not have a negative effect of less than 100. This is illustrated with average data for both standard 308 L/316 L electrodes as well as 308 LCF/316 LCF types.

By shifting the AC waveforms with increased negative effect to less than 100 (or lower), the "L" electrodes (ferrite numbers between 6-10 inclusive) were made to perform as if they were of the more controlled "LCF" type having a lower ferrite number (typically between 4.2-5.1 inclusive).

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An arc welding system, comprising:
a welding power source which generates a welding output for performing a welding process on stainless steel, the welding output having an AC welding output current;
an L-grade stainless steel welding electrode; and
a controller coupled to said welding power source which controls the welding power source to generate the welding output to said welding electrode, wherein the AC welding output current is biased toward DC negative such that the welding output has a negative effect of less than 100 per equation #1;

$$\text{Negative Effect} = \left[ 0.7 * \left( \frac{I_{p,p} * B - I_{p,n} * (100-B)}{100} \right) * (I_{p,p} + I_{p,n}) + 0.3 * \left( \frac{V_{p,p} * B - V_{p,n} * (100-B)}{100} \right) * (V_{p,p} + V_{p,n}) \right] * \left( \frac{1}{1000} \right)$$

Equation #1 wherein:
B is a percentage of time said welding electrode is positively charged;
$I_{p,p}$ is a peak current in an electrode positive polarity of the welding output;
$I_{p,n}$ is a peak (absolute) current in an electrode negative polarity of the welding output;
$V_{p,p}$ is a peak voltage in the electrode positive polarity of the welding output; and
$V_{p,n}$ is a peak (absolute) voltage in the electrode negative polarity of the welding output, and
wherein the controller is configured to one or both of: determine the negative effect of a welding waveform, and receive the negative effect as a set point.

2. The system of claim 1, wherein the negative effect is in a range of −700 to 100.

3. The system of claim 1, wherein the negative effect is in a range of −700 to 0.

4. The system of claim 1, wherein the negative effect is in a range of −100 to 100.

5. The system of claim 1, wherein the negative effect is in a range of −100 to 0.

6. The system of claim 1, wherein the negative effect is in a range of −80 to 80.

7. The system of claim 1, wherein the negative effect is in a range of −80 to 0.

8. The system of claim 1, wherein said welding output is a submerged arc welding output.

9. An arc welding system, comprising:
a welding power source which generates a welding output for performing a welding process on stainless steel, the welding output having a first welding output portion and a second welding output portion, where said first welding output portion has an AC welding output current;
an L-grade stainless steel welding electrode; and
a controller coupled to said welding power source which controls the welding power source to generate the welding output to said welding electrode, wherein the AC welding output current is biased toward DC negative such that the first welding output portion has a negative effect in the range of −700 to 100 per equation #1;

$$\text{Negative Effect} = \left[ 0.7 * \left( \frac{I_{p,p} * B - I_{p,n} * (100-B)}{100} \right) * (I_{p,p} + I_{p,n}) + 0.3 * \left( \frac{V_{p,p} * B - V_{p,n} * (100-B)}{100} \right) * (V_{p,p} + V_{p,n}) \right] * \left( \frac{1}{1000} \right)$$

Equation #1 wherein:
B is a percentage of time said welding electrode is positively charged;
$I_{p,p}$ is a peak current in an electrode positive polarity of the welding output;
$I_{p,n}$ is a peak (absolute) current in an electrode negative polarity of the welding output;
$V_{p,p}$ is a peak voltage in the electrode positive polarity of the welding output; and
$V_{p,n}$ is a peak (absolute) voltage in the electrode negative polarity of the welding output, and
wherein said first welding output portion is in a range of 35 to 95% of a total duration of said welding output, and
wherein the controller is configured to one or both of: determine the negative effect of a welding waveform, and receive the negative effect as a set point.

10. The system of claim 9, wherein said first welding output portion is in the range of 45 to 85% of the total duration of said welding output.

* * * * *